Dec. 27, 1966 J. NAZALI ETAL 3,294,256
ARTICLE HANDLING APPARATUS
Filed April 22, 1964 4 Sheets-Sheet 1
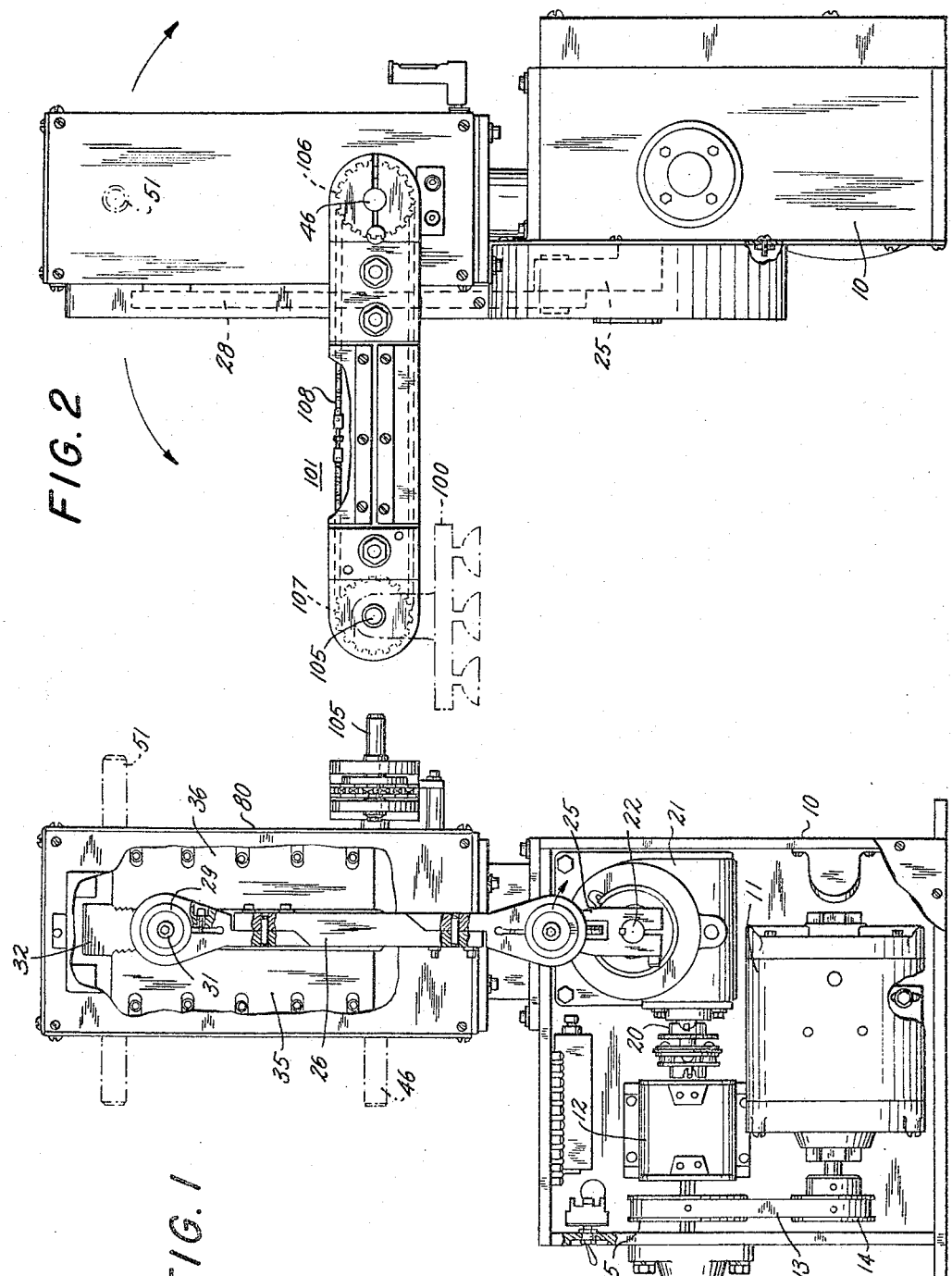
INVENTORS
JOSEPH NAZALI
ROBERT M. STRIEBY
BY
Pennie, Edmonds, Morton Taylor Adams
ATTORNEYS Dec. 27, 1966 J. NAZALI ETAL 3,294,256
ARTICLE HANDLING APPARATUS
Filed April 22, 1964 4 Sheets-Sheet 2
FIG. 3
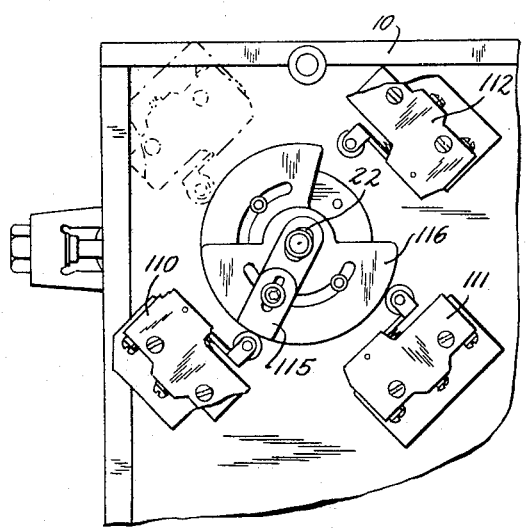
FIG. 4
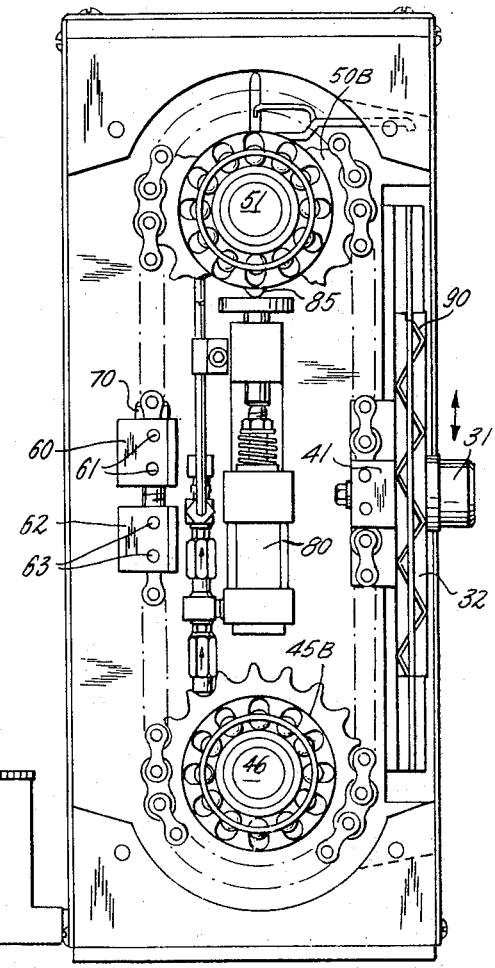
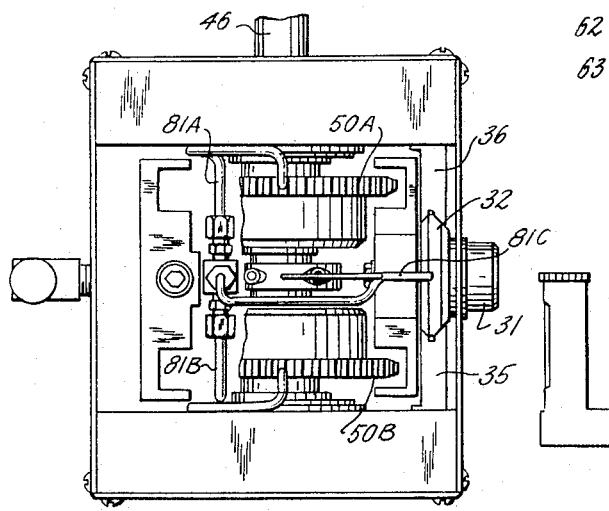
FIG. 5
INVENTORS.
JOSEPH NAZALI
ROBERT M. STRIEBY
BY
Pennie, Edmonds, Morton, Taylor & Adams
ATTORNEYS

INVENTORS.
JOSEPH NAZALI
ROBERT M. STRIEBY

Dec. 27, 1966 J. NAZALI ETAL 3,294,256
ARTICLE HANDLING APPARATUS
Filed April 22, 1964 4 Sheets-Sheet 4

INVENTORS.
JOSEPH NAZALI
ROBERT M. STRIEBY
BY
*Pennie, Edmonds, Morton, Taylor + Adams*
ATTORNEYS

United States Patent Office 3,294,256
Patented Dec. 27, 1966

3,294,256
ARTICLE HANDLING APPARATUS
Joseph Nazali, Takoma Park, and Robert M. Strieby, Silver Spring, Md., assignors, by mesne assignments, to GBL Corporation, Washington, D.C., a corporation of Maryland
Filed Apr. 22, 1964, Ser. No. 361,652
4 Claims. (Cl. 214—1)

The present invention relates to article handling apparatus and more particularly to apparatus which is adapted to automatically pick up individual articles at a given delivery station, and transfer those articles to a second station either on a periodic or an aperiodic time basis.

The apparatus provided by the present invention is particularly suited for automatically transferring individual pre-oriented component parts from a parts feeder, for example, to a work station in an automatic assembly operation or to a storage station in an automatic article packing operation or the like. The apparatus of the present invention is simple in its structure, precise in its repetitive ability to pick up, transfer and place down components at a desired work or assembly location, and versatile in its ability to function cooperatively on a programmed basis with a variety of other machines as either a controlled slave machine or as a controlling master machine.

It is a principal object of the present invention to provide a versatile and reliable automatic article handling device having a minimum number of electrical and mechanical components which device is extremely durable and reliable in maintaining its positioning precision.

In accordance with the present invention, manipulator apparatus is provided having at least one transfer arm pivotally mounted on a drive shaft rotatably driven so as to travel through an arcuate path of travel generally defined within a vertical plane. Means are provided for mounting one or more sets of grasping jaws, vacuum pickup heads or the like at the end of each transfer arm, which devices are adapted to be actuated in synchronism with the arm motion to pick up and release the articles to be transferred at the appropriate end points of the arm travel.

In accordance with a principal feature of the invention, means are provided for converting the continuous rotational drive motion of a crank arm to reciprocating movement in translation which latter movement is then converted to reciprocating rotational drive for moving the transfer arm through an arcuate path of travel in harmonic motion. In a preferred embodiment of the invention, drive of the transfer arm is effected by reciprocally driving in translation a rail supported carriage that is in turn connected to a pair of sprocket chains entrained on sprocket gear drives for a pair of spaced transfer-arm drive shafts. Provisions are made for pre-loading the roller-chain drives so that substantially all back-lash is eliminated. Drive wear is maintained at a minimum because the total load in the drive system is distributed throughout a number of roller-chain links entrained on a plurality of cooperating sprocket gear teeth.

The foregoing and other features and advantages of the invention will be apparent from the following description of a preferred embodiment of the invention, as illustrated in the accompanying drawings in which:

FIG. 1 is a side elevation view of the article handling apparatus provided by the present invention;

FIG. 2 is an end elevation view of the apparatus shown in FIG. 1;

FIG. 3 is an enlarged view showing the cam actuated switch controls of the apparatus shown in FIG. 1;

FIG. 4 is an enlarged side elevation view of the chain and sprocket gear drive for the apparatus shown in FIGS. 1 and 2;

FIG. 5 is a top plan view of the drive apparatus shown in FIG. 4;

Figure 6:
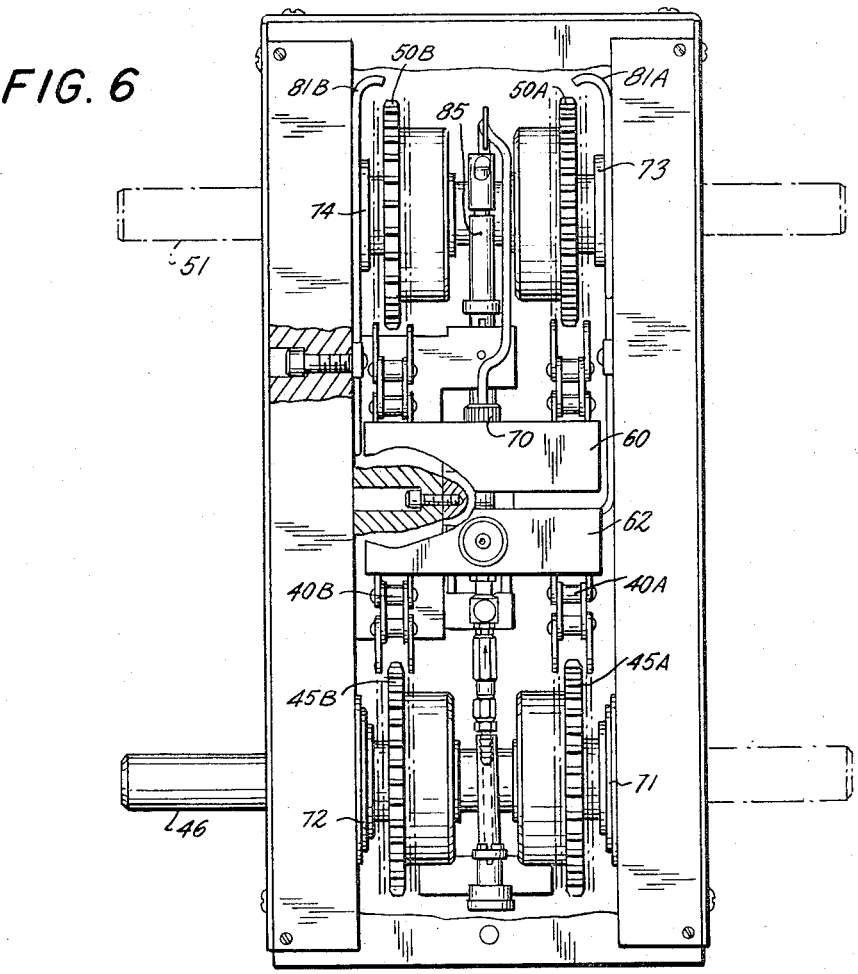
FIG. 6 is an enlarged rear elevation view of the chain and sprocket gear drive for the apparatus shown in FIG. 1.
Figure 7:
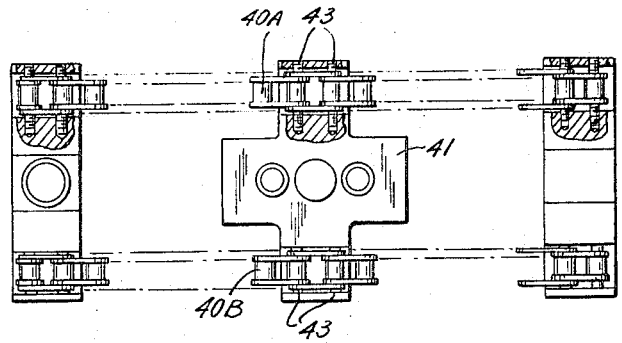
FIG. 7 is a fragmentary elevation view illustrating the means for coupling the drive carriage to the sprocket roller-chain.

Referring to the several figures, wherein like parts are identified with like numerals, the apparatus provided by the present invention includes a base frame support 10 which houses drive motor 11, a combined magnetically actuated clutch and brake 12 driven with timing belt 13 by pulleys 14 and 15 as illustrated. The drive output of 12 is connected to the input shaft 20 of gear reduction box 21. Connected to the output shaft 22 of gear box 21 is crank arm 25, the crank shaft of which is coupled to the lower bearing 26 of connecting rod 28. The upper bearing 29 of connecting rod 28 is fitted to shaft 31 which is in turn affixed to drive carriage 32.

When drive motor 11 is electrically energized, crank arm 25 is rotated continuously in one direction, e.g. clockwise as illustrated, and carriage 32 is driven reciprocally in translation by connecting rod 28. The effective length of arm 25 is preferably made adjustable as illustrated so that the arc length of travel for the arm may be shortened or lengthened from a nominal value of 180 degrees as required.

Carriage 32 is supported for up and down movement by carriage rails 35 and 36, the inner guide surfaces of which define female V-shaped guide surfaces to match the male V-shaped edge surfaces of carriage 32. Carriage 32 is rigidly coupled to sprocket drive chains 40a and 40b by coupling plate 41 the central portion of which is bolted to carriage 32 and the outer arms of which are securely coupled to a pair of links on chains 40a and 40b respectively by pins 43.

As best illustrated in FIGS. 4 and 6, sprocket chains 40a and 40b are each operatively coupled to a pair of sprocket gears 45a and 45b operatively keyed to rotatably drive lower drive shaft 46; chains 40a and 40b are also operatively coupled to upper sprocket gears 50a and 50b each of which is keyed to drive shaft 51.

It will be understood that upward movement of carriage 32 causes shaft 46 and 51 to be rotatably driven in one direction and downward movement of carriage 32 causes these same shafts to be driven in the opposite direction.

As is illustrated in FIGS. 4 and 6, the uppermost ends of sprocket chains 40a and 40b are pinned to chain tensioning clamp 60 by pins 61; in like manner the lower ends of chains 40a and 40b are secured to chain tensioning clamp 62 by pins 63. Clamps 60 and 62 are drawn together by the tightening of tensioning screw 70, the lower end of which is threadably engaged in clamp member 62. The tightening of clamp members 60 and 62 effectively pre-loads drive chains 40a and 40b thereby effectively eliminating back-lash in the entire drive mechanism. Shafts 46 and 51 are advantageously supported in the base frame by conical roller bearings 71, 72 and 73, 74.

Sprocket chains 40a and 40b are preferably of the roller-chain type and the cooperating sprocket gears 45a, 45b, 50a and 50b are preferably made of hardened steel. It will be appreciated by those skilled in the art that one of the outstanding advantages of the drive mechanism provided by the present invention resides in the fact that the total drive load is distributed over a number of sprocket gear teeth and a corresponding number of chain links so that gear and chain link wear and loading is reduced to a minimum.

In the preferred embodiment of the invention, the sprockets, sprocket chains and the V-groove races for carriage 32 are continuously lubricated by oil pump 80 through pipes 81a, 81b, and 81c as illustrated in FIGS. 4, 5, and 6. Oil pump 80 is actuated by cam 85 which is clamped to and driven by shaft 51 as shown. The guide surfaces of vertical carriage 32 are preferably provided with a zig-zag groove 90 as shown in FIG. 4 to provide improved distribution of lubricating oil supplied from 81c across the entire bearing surfaces of the carriage 32 and the respective V-grooves in carriage rails 35 and 36.

Although the article handling apparatus provided by the present invention is adapted to be used with a variety of different types of transfer arms and grasping or pickup type devices, in the preferred embodiment as illustrated in FIG. 2, means are provided for maintaining the pickup head 100 in a fixed orientation throughout the complete path of travel for the arm 101. To this end, support shaft 105 for pickup head 100 is rotatably driven by sprocket gear 106 coupled to sprocket gear 107 by chain 108. Sprocket 107 is keyed to shaft 105, whereas sprocket gear 106 is pinned to and supported by the frame base and not permitted to rotate with shaft 46. It will be understood that a plurality of pickup arms may be mounted on either the lower shaft 46 or on the upper shaft 51 as the particular application may require.

Figure 8:
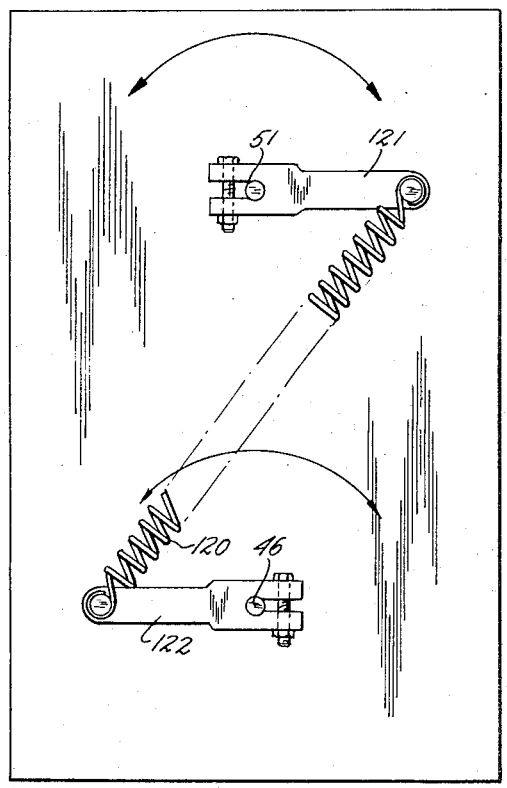
FIG. 8 is an elevation view illustrating a spring loading system for the drive shown in FIGS. 4 and 6.

In accordance with a further aspect of the invention, the unused ends of shaft 46 and 51 may be cross-connected or coupled together with spring member 120 via crank arms 121 and 122 as shown in FIG. 8. Crank arms 121 and 122 are so phased mechanically as to place spring 120 in maximum tension when arm 101 arrives at its endpoints of travel. Energy storage in the spring assists in both the pickup of relatively heavy loads and in the slow-up of arm travel prior to stopping of the arm.

In FIG. 3 of the drawings, there is shown drive actuated switch means for producing signals to control the various stop, start, and dwell functions of the transfer arm and the pickup and release functions of the pickup head 100. Micro-switches 110, 111 and 112 are affixed to the base 10 of the manipulator apparatus and are arranged to develop control signals for identifying the end and intermediate positions of arm travel. The various arms of the micro-switches are actuated by cam arm 115 driven by shaft 22 and adjustable clamp member 116 as illustrated.

Figure 9:
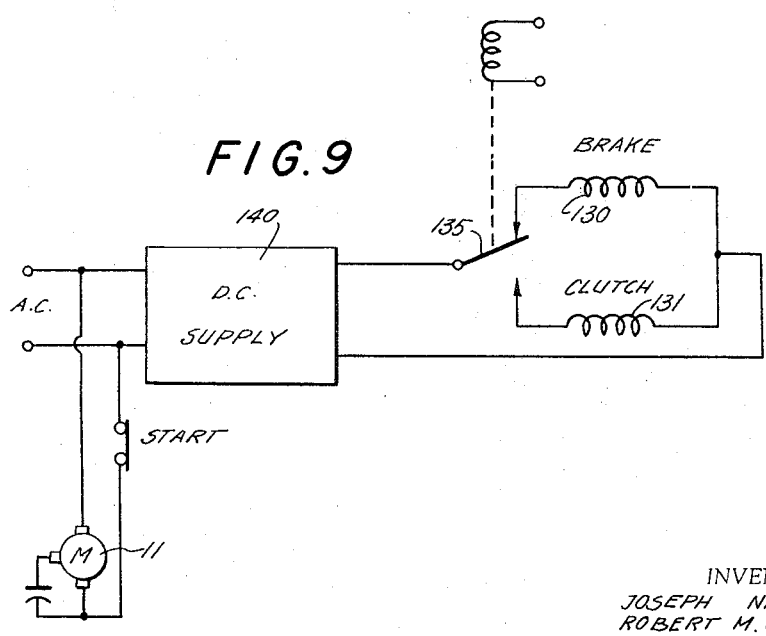
FIG. 9 is a simplified schematic diagram of the electrical control circuit for the article handling apparatus shown in FIG. 1.

As indicated above, drive for the transfer arm provided by the present invention is preferably controlled by combined magnetic clutch and magnetic brake 12 shown in FIG. 1. Since the operation of such a device is well known in the art, no further description will be given herein. For purposes of the present operational explanation, it will suffice to say that a first solenoid 130 is provided to apply braking action to the drive and a second solenoid 131 is provided to actuate or engage the drive clutch. As shown in FIG. 9, a single-pole double-throw relay controlled switch 135 is provided to alternatively energize the brake or the clutch with D.-C. currents applied by D.-C. power supply 140. Drive motor 11 may be continuously energized from the A.-C. power lines and drive to the transfer arm may be quickly coupled or uncoupled as required by energization or de-energization of the clutch 131. Coasting of the drive system is precluded by the energization of brake 130 at the same time clutch 131 is de-energized.

While the invention has been particularly shown and described with reference to a preferred embodiment thereof, it will be understood by those skilled in the art that various changes in form and details may be made therein without departing from the spirit and scope of the invention.

What is claimed is:

1. Article handling apparatus including a support base, a pair of spaced parallel drive shafts rotatably journaled in said base, each of said shafts having a pair of spaced drive sprockets mounted thereon, a drive carriage, guide rails slidably mounting said drive carriage between said shafts on said base for reciprocating movement in translation along a path parallel to the common plane passing through the longitudinal axes of said shafts, first and second sprocket chains, each being entrained on a sprocket on each of said shafts, means for coupling said carriage to each of said sprocket chains, adjustable means for preloading said sprocket chains under tension, and rotary drive means connected directly to said carriage for reciprocating said carriage along said path.

2. Apparatus in accordance with claim 1 characterized in that means are provided for adjusting the stroke length of the reciprocating movement of said carriage.

3. Article handling apparatus including a support base, a pair of spaced parallel drive shafts rotatably journaled in said base, each of said shafts having at least one drive sprocket mounted thereon, a drive carriage, guide rails slidably mounting said drive carriage between said shafts on said base for reciprocating movement in translation along a path parallel to the common plane passing through the longitudinal axes of said shafts, a sprocket chain entrained on each sprocket on each of said shafts, means for coupling said carriage to each of said sprocket chains, adjustable means for preloading each of said sprocket chain under tension, and rotary drive means connected directly to said carriage for reciprocating said carriage along said path.

4. Article handling apparatus including a support base, a pair of spaced drive shafts rotatably journaled in said base, each of said shafts having a drive sprocket mounted thereon, a drive carriage, guide rails slidably mounting said drive carriage between said shafts on said base for reciprocating movement in translation, a sprocket chain entrained on each of said shaft sprockets, means for coupling said carriage to said sprocket chain, rotary drive means connected directly to said carriage for reciprocating said carriage, an operating arm mounted on one of said shafts and adapted to be rotated through an arcuate path of travel, article pickup means operably supported by said arm, a first crank arm connected at one end to one of said shafts for rotation therewith, a second crank arm connected at one end to the other of said shafts for rotation therewith, said crank arms extending away from their respective shafts in opposite directions relative to each other, and spring means connected at opposite ends to the extending ends of said crank arms for urging said extending ends toward each other.

References Cited by the Examiner

UNITED STATES PATENTS

| 1,721,551 | 7/1929 | Ferenci | 214—147 |
| 1,769,348 | 6/1930 | Krummel | 198—137 |
| 1,878,156 | 9/1932 | Lorenz | 214—1 |
| 3,102,696 | 9/1963 | Larsh | 74— 95 X |

FOREIGN PATENTS

| 973,290 | 10/1964 | Great Britain. |
| 355,007 | 7/1961 | Switzerland. |

MARVIN A. CHAMPION, *Primary Examiner.*